Patented Feb. 6, 1923.

1,444,333

UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

NITROCELLULOSE COMPOSITION.

No Drawing. Application filed December 27, 1920. Serial No. 433,397.

*To all whom it may concern:*

Be it known that I, HANS T. CLARKE, a subject of the King of Great Britain, residing at Rochester, in the county of Monroe and State of New York, have invented certain new and useful Improvements in Nitrocellulose Compositions, of which the following is a full, clear, and exact specification.

This invention relates to a nitrocellulose composition containing substances which enable it to be suitably manipulated and utilized in the plastic and analogous arts, such, for example, as sheet or film manufacture and varnish manufacture.

One object of this invention is to produce a composition which may be made into permanently transparent, strong and flexible sheets of suitable thinness that are substantially waterproof, are unaffected by ordinary photographic fluids, and in general possess all the desired properties of a support for sensitive photographic coatings. Other objects will hereinafter appear.

I have discovered that such a composition of matter can be obtained by compounding cellulose nitrate with the salicylates of the higher aliphatic alcohols, such as normal butyl salicylate, amyl salicylate and isobutyl salicylate. The ingredients are combined by the use of a common solvent.

In carrying out one illustration of my invention, I incorporate in 400 to 600 parts of an acetone and methyl alcohol mixture (say equal parts by weight of these solvents) 100 parts of nitrocellulose, 20 to 60 parts of fusel oil, normal butyl alcohol or isobutyl alcohol, and 1 to 70 parts (say 30 parts) of normal butyl salicylate. The ingredients are of commercial grades, having sufficient purity to provide the necessary transparency and comparative freedom from color in the finished film. The ingredients are thoroughly mixed and may be filtered if desired.

The solution, having sufficient thickness and viscosity to be flowed properly under the usual film manufacturing conditions, is made into film from which the volatile solvents evaporate, leaving a product suitable for any usual or preferred purpose in the art. The higher alcohols remaining in part in the film with the nitrocellulose and butyl salicylate enhance the stability of the film as well as increase its flexibility. Normal butyl salicylate has a boiling point of 155° C., at 15 mm., pressure, and, consequently, its boiling point under normal pressure is well above 230° C. Its volatility in the finished film is correspondingly so small as to be negligible. The equivalent salicylates of the other higher alcohols likewise have analogous properties.

Having thus described my invention, what I claim as new and desire to secure by Letters Patent is:

1. A composition of matter comprising cellulose nitrate and a salicylic acid ester of a monohydroxy aliphatic alcohol, having from 4 to 5 carbon atoms.

2. A composition of matter comprising cellulose nitrate and normal butyl salicylate.

3. A flowable film-forming composition of matter comprising cellulose nitrate, a salicylic acid ester of a monohydroxy aliphatic alcohol having from 4 to 5 carbon atoms, and a solvent common to both.

4. A composition of matter comprising cellulose nitrate, a salicylic acid ester of a monohydroxy aliphatic alcohol having from 4 to 5 carbon atoms and an organic body of only slight volatility to enhance the flexibility thereof.

5. A composition of matter comprising 100 parts of nitrocellulose, 400 to 600 parts of a volatile solvent, 20 to 100 parts of a monohydroxy aliphatic alcohol having from 4 to 5 carbon atoms, and from 1 to 70 parts of a salicylic acid ester of a monohydroxy aliphatic alcohol having from 4 to 5 carbon atoms.

6. As an article of manufacture, a sheet of deposited or flowed cellulose nitrate containing a salicylic acid ester of a monohydroxy aliphatic alcohol having from 4 to 5 carbon atoms.

7. As an article of manufacture, a sheet of deposited or flowed cellulose nitrate containing normal butyl salicylate.

8. As an article of manufacture, a sheet of deposited or flowed cellulose nitrate containing normal butyl salicylate and a monohydroxy aliphatic alcohol containing from 4 to 5 carbon atoms.

Signed at Rochester, New York, this 21st day of December, 1920.

HANS T. CLARKE.